Nov. 12, 1968     C. PARDO     3,410,679
METHOD OF MAKING METAL ALLOYS, PARTICULARLY FERROTITANIUM ALLOY
Filed July 26, 1965
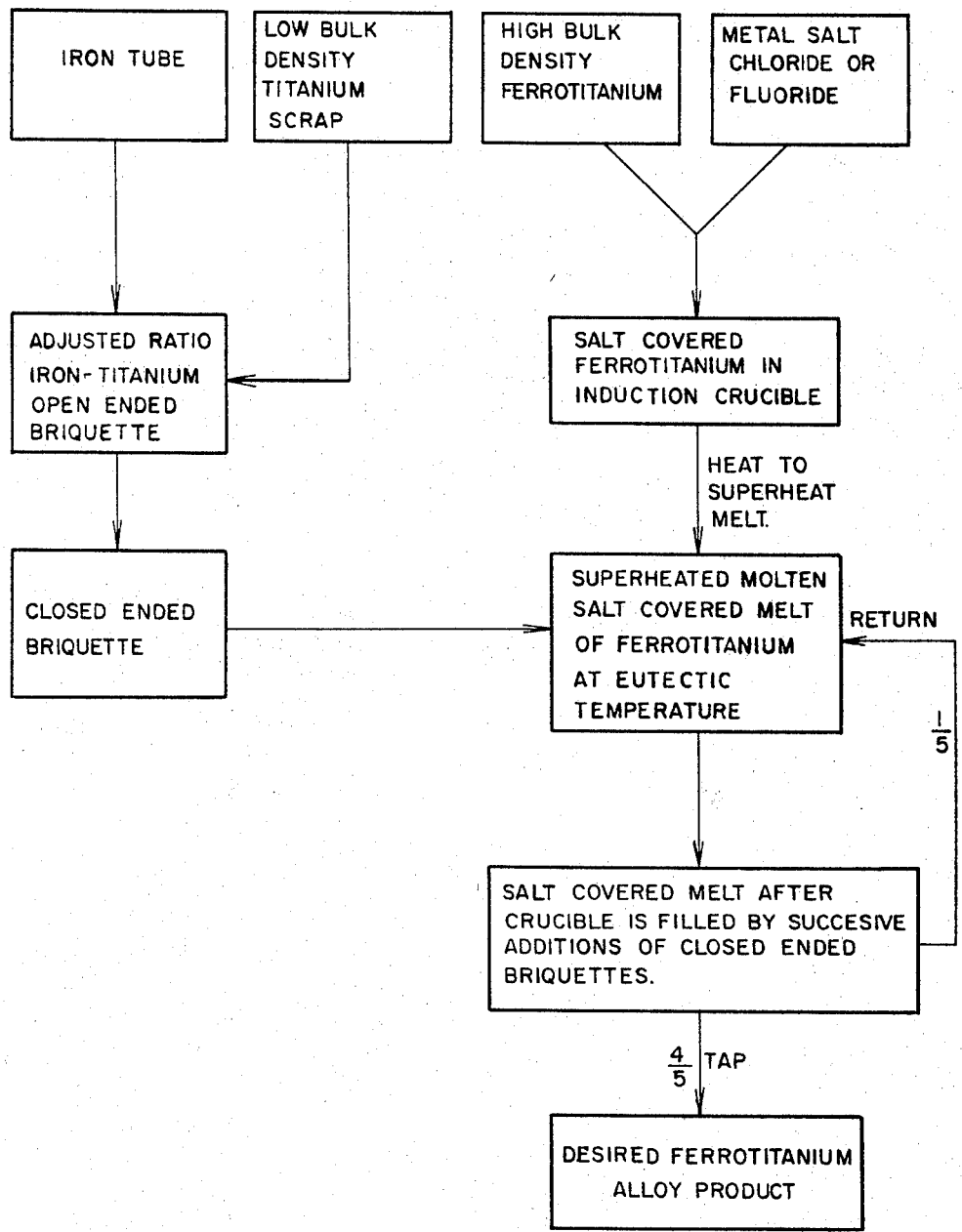
INVENTOR
CARLOS PARDO
BY
ATTYS.

United States Patent Office 3,410,679
Patented Nov. 12, 1968

3,410,679
METHOD OF MAKING METAL ALLOYS, PARTICULARLY FERROTITANIUM ALLOY
Carlos Pardo, Mexico City, Mexico, assignor, by mesne assignments, to TamMet International, Chicago, Ill., a partnership
Filed July 26, 1965, Ser. No. 474,625
12 Claims. (Cl. 75—129)

ABSTRACT OF THE DISCLOSURE

A process for producing ferrotitanium alloy utilizing titanium scrap in the form of low-bulk density shovelable turnings, borings and chips, and including the steps of loading the titanium scrap into an iron or steel tube, adjusting the ratio of titanium scrap weight to the tube weight by comparing the bulk densities of the scrap material and the tube dimension and the wall thickness of the tube to produce the desired iron-titanium ratio, sealing off the tube and charging the scrap-loaded tubes successively into a superheated molten-salt covered melt of high bulk density ferrotitanium within an induction furnace, said melt being maintained at or near the eutectic temperature of the ferrotitanium, thereafter tapping the desired ferrotitanium alloy product from the furnace; the melting process being one described as "induction melting in air" distinguishing from "vacuum melting" or the melting of metals in the presence of inert gases.

---

This invention relates generally to a process for the production of a metal alloy from metal scrap, and particularly concerns the production of ferrotitanium alloy from titanium scrap in the form of shavings, borings, turnings or any other finely divided form. More particularly, the invention provides a process for induction melting in air of finely divided titanium scrap, to produce ferrotitanium alloy.

The finely divided or low bulk density form of titanium scrap, that is turnings, shavings, chips and the like, are all known to be highly pyrophoric. A pyrophoric property is defined as a strong tendency toward oxidation so that the material has a great tendency to ignite spontaneously in the presence of air with rapid, if not explosive, results. The pyrophoric property of low bulk density titanium scrap, and the relatively low specific gravity of the material, makes the normal air melting technique highly impractical. The charged material tends to float on the surface of the melt whereupon radiant or conductive heating of the charge then leads to excessive oxidation, or even ignition of the charge with resultant poor recovery. Since titanium is known to react strongly at the titanium melting temperature with all known refractory lining materials for melting crucibles, it is exceedingly difficult to apply normal melting practice to the production of titanium rich alloys from such scraps.

Likewise the titanium is also strongly reactive at the melting temperature of iron as well.

It has been possible to utilize relatively large titanium scrap sections, such as gas turbine compressor blades, in the production of ferrotitanium because of the relatively high bulk density thereof and the ease of immersion of these larger pieces. However, economically the large solid materials are many times more costly than the finely divided titanium scrap on a per pound basis. It is this finely divided scrap which is the most abundant, and, as well, is undesirable waste material.

A principal object of this invention is to provide a method of producing ferrotitanium alloy from titanium and titanium alloy scrap of the finely divided, low bulk density type.

Another object of this invention is to provide a method of charging finely divided, low bulk density titanium scrap into a molten ferroalloy bath by encasing the scrap within an iron or steel tube in predetermined proportions.

Another object of this invention is to proivde a method for the maintenance of a given alloy composition during melting by adjustment of the ratio of titanium or titanium alloy scrap weight to the scrap containing iron tube weight.

Another object of this invention is to provide a method whereby titanium or titanium alloy scrap of a known bulk density is encased in an iron or steel tube whereby the titanium to iron ratio is at or near the eutectic composition of the ferrotitanium alloy whereby to permit melting at relatively low temperatures.

Another object of the invention is to provide a process for producing ferrotitanium alloy utilizing finely divided, low bulk density titanium scrap, the process including the steps of loading the titanium scrap into an iron or steel tube, adjusting the ratio of titanium scrap weight to tube weight by comparing the bulk density of the scrap material and the tube dimension and wall thickness of the tube to produce the desired iron-titanium ratio, sealing off the tube and charging the scrap loaded tubes into a melt of ferrotitanium covered by a suitable, non-reactive liquid salt cover, the composition ratio of titanium to iron being chosen at or near the eutectic composition of the ferrotitanium alloy.

It is considered that the process of formulating metal alloys by induction melting in air which includes the step of covering the metal melt with a liquid layer of metal salt is applicable generally to this art.

The use of the term "induction melting in air" is intended to distinguish from vacuum melting of metals or melting of metals in the presence of inert gases. As generally understood, induction melting in air of finely divided titanium scrap to produce ferrotitanium is a highly impractical, dangerous and usually disastrous method. The process described hereafter is believed to be the first safe method known to the art to produce ferrotitanium alloy by induction melting of finely divided titanium scrap in air. The process is described in the ensuing paragraphs and diagrammatically illustrated as a flow sheet in the accompanying drawing.

Small sized titanium scrap, which may be referred to as "shovelable turnings, borings and chips," is loaded into a closed end of an iron as steel tube. The source of such small sized titanium scrap may be from industrial wastes such as shavings, borings, turnings and like finely divided scrap material now considered waste and available readily from processors of titanium and titanium alloy containing parts. Scrap material well suited for use in the novel process is known in the art as "shovelable turnings, borings and chips." Generally, the desired chip width is $1/16''$–$1/4''$. The ratio of titanium scrap weight to tube weight is determined by the ferrotitanium alloy chemistry desired. With knowledge of the composition and bulk density of the scrap, the tube's dimensions and wall thickness can be selected to produce the desired ratio. The bulk density of the scrap can be altered by crushing and/or sizing operations. If desired, iron scrap may be mixed with the titanium scrap to provide a higher iron type ferrotitanium alloy. The open end of the tube then is closed off, e.g. by crimping or capping. A vent may be provided at the ends or along the length of the tube to permit any entrapped air to escape during the heating and melting operations to follow. The scrap utilized must be of a character substantially free of foreign matter, oils, dirt, water, etc. which could cause excessive gassing during the melting operations. The length of the compacted tubes is relatively unimportant and determined solely on the basis of ease of handling for the charging thereof into the furnace. Generally, lengths of tube from eighteen inches to four feet are preferred.

For the puropose of differentiating between the hollow iron tubes and the scrap loaded tubes, the latter will be referred to alternatively as cans or briquettes. The use of the term briquette is not intended to include materials which are formed, generally under high pressure, of sponge iron and titanium, and which are generally utilized in lieu of master alloys for addition of titanium to form the ultimate alloys such as stainless steel.

Prior to charging the scrap loaded tubes or so called briquettes into an induction furnace, a charge composed of large solids preferably of the desired alloy composition is melted in a furnace crucible having a lining which exhibits reasonable stability in contact with ferrotitanium. Such a lining generally is made of high alumina or magnesia content materials. The volume of the molten charge generally may be from 10% to 30% of the crucible's capacity. During melting, this charge must be protected from oxidation. This protection is afforded according to the invention by provision of a suitable non-reactive liquid salt cover. Materials which are preferred to be utilized for such liquid salt cover include barium chloride, barium chloride-sodium chloride mixtures, cryolite and similar chloride or fluoride mixtures, which are relatively stable with ferrotitanium at the melting temperature generally employed.

Once the large solids charge has been completely melted, it is super-heated to a degree which will prevent excessive chilling during the tube charging operation. Now a scrap loaded tube is lowered into the furnace crucible or refractory lining. The lower end of the tube first penetrates the salt layer and thereafter contacts the liquid metal. Intimate contact is established therefore between can metal, scrap metal and the liquid alloy in the furnace. Liquid-solid diffusion takes place, causing both can and scrap materials to dissolve into the melt. Since the titanium to iron ratio of the can and its contents is about the same as that of the melt, no appreciable composition change takes place within the melt during the solution of the can and scrap metal therein. As the metal materials are melting, the melt surface continues to be protected by the molten salt cover whereby to prevent oxidation. A succeeding "can" and scrap contained therein may be charged into the furnace as each can and its contents are melted. This continues until the crucible is filled as desired.

The melted alloy is recovered generally by tapping. Prior to tapping, most of the salt cover is removed by pouring or skimming in the known manner. If a succeeding charge of the same alloy composition is to be melted, only four-fifths of the melt is poured into convenient pig molds. The remainder serves as a heel or continuum for continuing melting operations. The decanted salt is poured back into the crucible prior to continuing the melting operation. The said salt can be utilized as a cover many times depending upon the stability and contaminant level thereof. Obviously, an analysis at reasonable intervals is recommended.

The economics of this process are optimized when the melt composition is in the 60% to 75% titanium range. This is due to the relatively low temperature liquidus of such alloys in contrast to other ferrotitanium compositions. This low liquidus temperature greatly reduces the reactivity between the melt, furnace linings, and slag. Also, less electric power is required for complete melting. However, should ferro-alloy compositions ranging from 10% to 80% titanium be required, they can be most economically produced by dilution of the optimum melt composition with either scrap solids of iron or of titanium.

Another advantage of the method according to the invention is the ability to control the carbon content of the alloys melted by the process simply by varying from .05% to 8.0% by selection of scrap materials of suitable carbon content and/or the use of solid graphite in the "can."

Thus, the process is capable of producing alloy products which are sold on the market as low, medium and high carbon ferrotitanium. Similarly, composition limits of so-called tramp elements, such as aluminum, vanadium and silicon may be determined by the charging scrap composition.

By way of example, the process according to the invention was successfully utilized in forming a ferrotitanium alloy assayed as follows:

| | Percent |
|---|---|
| Titanium | 66.6 |
| Iron | 25.0 |
| Vanadium | 2.4 |
| Silicon | 0.4 |
| Carbon | 0.1 |
| Aluminum ca. | 5.5 |

A single section of iron tube formed of SAE 1015 steel and having a composition as follows:

| | Percent |
|---|---|
| Carbon | 0.13–0.18 |
| Manganese | 0.30–0.60 |
| Phosphorus | 0.04 (max.) |
| Sulfur | 0.05 (max.) |
| Iron, remainder. | | was filled with titanium scrap turnings having a composition as follows:

| | Percent |
|---|---|
| Aluminum | 5.5–6.75 |
| Vanadium | 3.5–4.5 |
| Nitrogen | 0.07 (max.) |
| Carbon | 0.01 (max.) |
| Hydrogen | 0.015 (max.) |
| Iron | 0.4 (max.) |
| Oxygen | 0.3 (max.) | with 3.78 lbs. of scrap filling a tube weighing 1.22 lbs. Such weights, of course, depend on the length of tube section. If a longer tube section were used, the total weight of the weights of scrap and tube would be greater.

The thus filled tube was sealed off and was charged into a superheated, molten salt covered melt held at 2450° F. ±50° during charging and melting. The resulting product was poured off at the same 2450° F. temperature.

The eutectic temperature of the alloy of the particular composition produced and described above is not specifically known. It is believed that the eutectic temperature of said resultant alloy lies between 2050° F. and 2100° F.

Further, where very large diameter iron tubing is utilized, it is feasible to include iron or steel scrap in the form of turnings, borings, chip and the like as a means for adjusting the iron composition of the ferroalloy produced. Such inclusion compensates for two problems possibly encountered in use of large diameter tube. First, a diffusion problem may occur since the material at the center of the tube is surrounded by titanium scrap in all radial directions. Secondly, the enclosed volume to iron mass ratio will increase as the tube diameter increases. Thus, the utilization of some iron or steel scrap in the titanium scrap mix is feasible under such circumstances.

While it is recognized that the use of molten salt baths to heat treat metals is widely known, applicant believes that molten salt baths were never utilized to melt metals or form alloy compositions.

The so-called master alloys of ferrotitanium generally are produced by the reduction of ferrotitanium oxides, such as ilmenite with a reducing agent such as aluminum, in electric arc furnaces. These processes for making such master alloys thereby are made relatively expensive, and the master alloys likewise are expensive. Use of the process according to the invention will permit master alloys to be produced more economically and, advantageously, to make use of a present waste material. It is believed that the process according to the invention has been described with sufficient detail to enable one skilled in the art to practice the same.

What I claim is:
1. The process for producing ferrotitanium alloy utilizing finely divided low bulk density titanium scrap, the process including the steps of, loading the titanium scrap into an iron or steel tube, adjusting the ratio of titanium scrap weight to tube weight by comparing the bulk density of the scrap material and the tube dimension and wall thickness to produce the desired iron-titanium ratio, and charging the scrap loaded tubes into a melt of ferrotitanium covered by a non-reactive liquid salt cover, the composition ratio of titanium to iron being chosen at or near the eutectic composition of the ferrotitanium alloy.

2. The process as described in claim 1 in which the liquid salt comprises a metal chloride or fluoride.

3. The process as described in claim 1 in which the titanium-iron ratio is in the range of 60 to 70 percent titanium.

4. The process as described in claim 1 in which the carbon content of the ferrotitanium alloy is controlled by the addition of carbon containing scrap to the iron tube.

5. The process as described in claim 1 in which the carbon content of the ferrotitanium alloy is controlled by the adition of solid graphite to the scrap carrying tube.

6. A process for producing ferrotitanium alloy having a selected titanium content in the range of from 10 to 80 percent titanium utilizing low bulk density titanium containing scrap metal in the form of turnings, shavings, borings and the like, said process comprising the steps of first forming a briquette by filling an iron containing tube with the scrap metal whereby the ratio of titanium to iron in said briquette is equal to the composition of the finished desired alloy, closing the ends of the scrap filled tube, inserting the thus closed off briquettes one at a time into a vessel containing a preformed melt formed of high bulk density ferrotitanium alloy and a covering of liquid slag material until the vessel is filled and thereafter removing a substantial quantity of the ferrotitanium alloy from the vessel.

7. The process as claimed in claim 6 in which the titanium-iron ratio of the briquette approximates the eutectic composition of the selected ferrotitanium alloy whereby to permit melting at relatively low temperatures.

8. The process as claimed in claim 6 in which the liquid slag comprises a metal chloride or fluoride.

9. The process as claimed in claim 8 in which the titanium-iron ratio of the briquettes is in the range of 60 to 75 percent titanium.

10. The process as claimed in claim 8 in which the carbon content of the ferrotitanium alloy is controlled by the addition of carbon-containing scrap to the iron tubes.

11. The process as claimed in claim 8 in which the carbon content of the ferrotitanium alloy is controlled by the addition of solid graphite to the scrap carrying briquiettes.

12. The process as claimed in claim 8 in which the carbon content of the ferrotitanium alloy is controlled between 0.05% and 8.0%.

References Cited

UNITED STATES PATENTS

| | | | |
|---|---|---|---|
| 1,476,192 | 12/1923 | Veazey | 75—96 X |
| 1,913,929 | 6/1933 | Kerschbaum | 75—65 X |
| 1,921,868 | 8/1933 | Evans | 75—10 |
| 1,937,065 | 11/1933 | Moore | 75—10 |
| 2,240,231 | 4/1941 | Stalhane | 75—10 |
| 2,766,110 | 10/1956 | Meister. | |
| 3,085,124 | 4/1963 | Upton | 75—65 X |
| 3,089,766 | 5/1963 | DeWald | 75—43 |
| 3,245,779 | 4/1966 | Moore | 75—65 |

L. DEWAYNE RUTLEDGE, *Primary Examiner.*

H. W. TARRING, *Assistant Examiner.*